(12) United States Patent
Bagley

(10) Patent No.: US 12,019,793 B2
(45) Date of Patent: Jun. 25, 2024

(54) TRACKED SHOULDER POSITION IN VIRTUAL REALITY MULTIUSER APPLICATION

(71) Applicant: VRChat Inc., San Francisco, CA (US)

(72) Inventor: Benjamin Bagley, Maebashi (JP)

(73) Assignee: VRChat Inc., San Francisco, CA (US)

( * ) Notice: Subject to any disclaimer, the term of this patent is extended or adjusted under 35 U.S.C. 154(b) by 0 days.

(21) Appl. No.: 17/992,760

(22) Filed: Nov. 22, 2022

(65) Prior Publication Data

US 2024/0168541 A1    May 23, 2024

(51) Int. Cl.
  *G06F 3/01* (2006.01)
  *G06T 13/40* (2011.01)
(52) U.S. Cl.
  CPC .............. *G06F 3/011* (2013.01); *G06T 13/40* (2013.01)
(58) Field of Classification Search
  CPC ................................ G06F 3/011; G06T 13/40
  See application file for complete search history.

(56) References Cited

U.S. PATENT DOCUMENTS

| | | | |
|---|---|---|---|
| 2020/0183567 A1* | 6/2020 | Gullicksen | G06F 3/0482 |
| 2020/0394806 A1* | 12/2020 | Payne | G06T 13/40 |
| 2022/0054042 A1* | 2/2022 | Kobayashi | A61B 5/1121 |
| 2023/0023609 A1* | 1/2023 | Winold | A63B 71/0622 |
| 2023/0130535 A1* | 4/2023 | Ma | G06T 19/006 |
| | | | 345/474 |

* cited by examiner

*Primary Examiner* — Lixi C Simpson
(74) *Attorney, Agent, or Firm* — Polsinelli PC

(57) ABSTRACT

The present technology pertains to shoulder positioning with body tracking in a multiuser virtual reality (VR) application. In one aspect, a client device that is participating in the multiuser VR application and may be configured to: determine a shoulder position based on a height of a user, wherein the shoulder position is mapped to an avatar in a virtual world; receive sensor data from an arm motion sensor attached to the user, wherein the sensor data identifies motion of an arm of the user; determine a movement vector of the shoulder position of the user using the sensor data; determine a shoulder avatar movement vector for a shoulder of the avatar from the movement vector; and render the avatar with the shoulder positioned based on the shoulder avatar movement vector.

20 Claims, 12 Drawing Sheets

TRACKED SHOULDER POSITION IN VIRTUAL REALITY MULTIUSER APPLICATION

BACKGROUND

Users of computing systems utilize avatars to stand in for their physical presence in a variety of applications ranging from simple chat applications to elaborate three-dimensional (3D) environments used in video game applications and virtual reality applications. A simple version of an avatar could be a shape of the shoulders and a head without any distinguishing features. Some avatars can be complex and can be associated with detailed graphics, textures, and can be capable of various animations. For example, some avatars include a number of portions that are separately animated for realistic or non-realistic motion, e.g. hair, tails, ears, clothing, etc. In some cases, a multiuser virtual reality application can have hundreds of avatars and corresponding client devices interacting within that environment.

BRIEF DESCRIPTION OF THE DRAWINGS

To easily identify the discussion of any particular element or act, the most significant digit or digits in a reference number refer to the figure number in which that element is first introduced.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
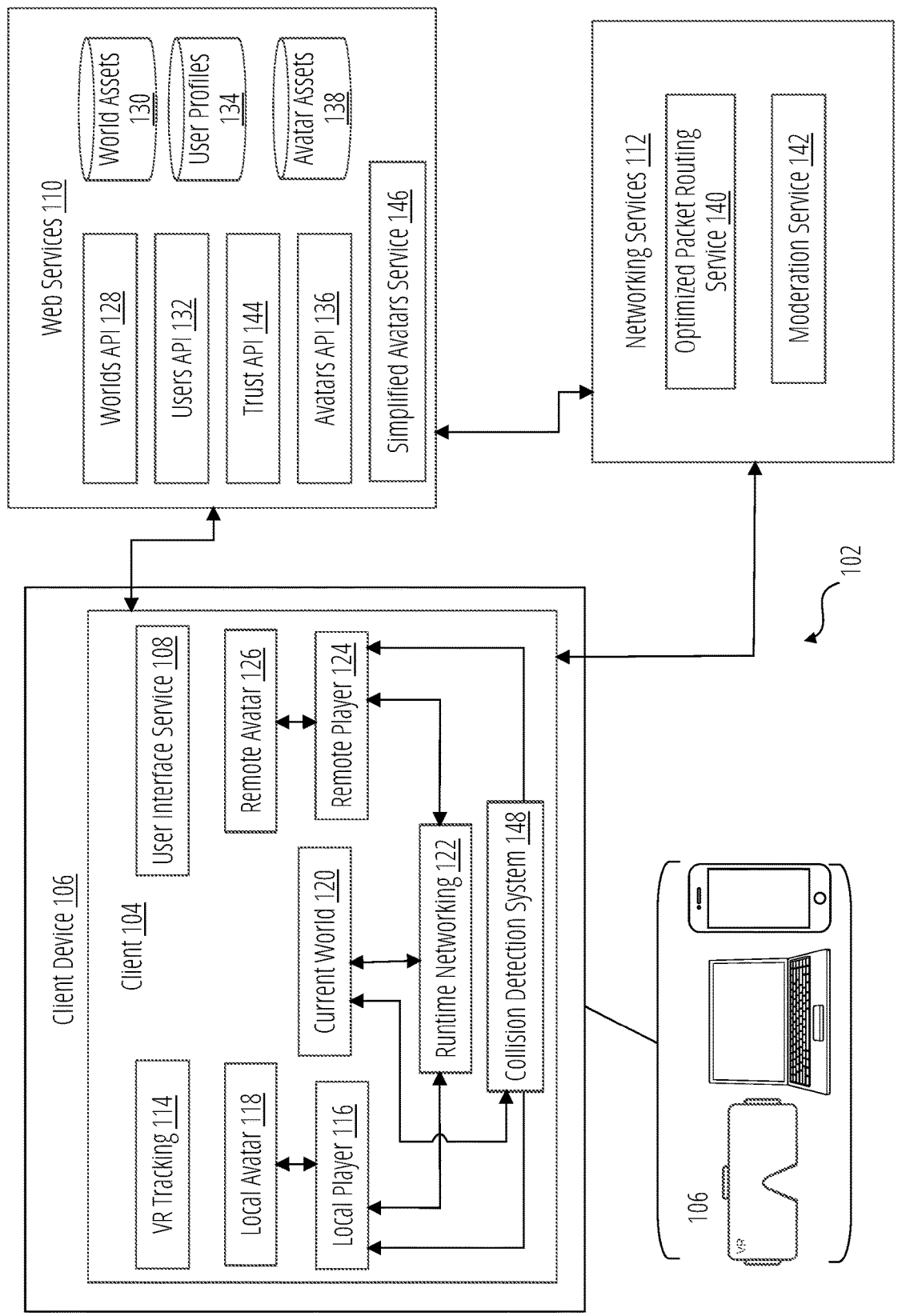
FIG. 1 illustrates an example virtual world platform for playing and hosting a multiplayer virtual reality (VR) experience in accordance with some aspects of the present technology.

Interactions between users in virtual worlds such as those hosted by some virtual reality platforms continue to evolve. Initially interactions were limited to co-existing in the same world and playing a game together. Interactions progressed to live communications, and then to attending virtual events together. Recently, users have begun to increase the range of motion of their avatars to interact within these virtual worlds and with objects within the virtual world. For example, characters within the virtual world are now able to exercise or dance at a nightclub in virtual worlds, and various contact-based interactions between characters can occur and trigger events that occur within the virtual world.

Virtual worlds are 3D spaces that can have a range of interactions including interactions within the environment and interactions with other avatars. In some cases, interaction within the environment can be performed with an input controller, which provides an interface to interact with the environment. A game controller can be a type of input controller, and an input controller can also include a virtual reality (VR) controller that may provide data to identify a point in space where the VR controller is physically positioned. For example, a VR controller can be used to identify a point in space and an orientation of the VR controller.

Virtual worlds may implement inverse kinematics (IK), which is the mathematical process of calculating the variable joint parameters needed to place the end of a kinematic chain, such as a robot manipulator or animation character's skeleton, in a given position and orientation relative to the start of the chain. IK can be used to determine a position of various aspects of a virtual world, such as a location of a player's arm within the virtual world.

Using a VR controller or another conventional input controller can only provide a limited range of input within the virtual world and IK alone cannot accurately determine a position corresponding body parts of avatars within the virtual world. For example, IK may accurately determine position of a wrist that corresponds to a VR controller's location in space, but IK may not accurately determine a position of the elbow due to a position of the person's shoulder, which is capable of multiple types of movement within physical space.

Some virtual worlds can support more complex interactions based on using full-body tracking, which can be accomplished using various techniques. One technique is using a number of motion sensors, such as inertia measurement units (IMUs) that are positioned at various locations on the body, which is referred to as inside-out tracking. Inside-out tracking refers to using sensors attached to a person to track their movement and position. Another technique of full body tracking is using a full body tracking suit with objects that are tracked using an external system, which is referred to as outside-in tracking. Outside-in tracking refers to using an external sensor system that identifies movement and position of the tracked subject.

Complex movements in the virtual world can be accomplished with full body tracking that requires a large number of motion sensors to track the positions of shoulders, elbows, hips, feet, and knees. In some cases, there are complexities with tracking shoulder movement based on using an arm motion tracking sensor because an embedded mapping is required. The embedded mapping identifies an offset from the arm motion tracking sensor to the shoulder joint but can create visual fidelity issues. For example, when a user raises their arm above their shoulder (e.g., lateral abduction), the offset associated with the embedded mapping can cause the shoulder joint to move downward and causes shoulder impingement, which is when a shoulder folds inwardly on itself. An example of an inwardly folded arm is illustrated herein with reference to FIG. 3.

A solution to the shoulder impingement issues is to fix a motion tracking sensor to the shoulder joint. This requires an additional sensor, incurs additional cost, and incurs additional computation resources. In addition, placing a shoulder tracking sensor directly at the user's shoulder can be difficult because placing a band through the armpit of the user can be difficult, uncomfortable, and may significantly affect arm movement.

An aspect of the present technology relates to tracking shoulder movements in a physical world and mapping shoulder movements in the physical world into the virtual world without an extra motion sensor (e.g., IMU) positioned at the user's shoulder. In one illustrative aspect, a shoulder can be tracked based on data provided by an IMU or other sensor, or can be untracked. A shoulder inversion factor can be computed that determines a quality of the shoulder appearance with respect to an arm. The shoulder inversion factor can be used to blend or interpolate a position of the arm based on the tracked position or the untracked position. The present technology enables a position of the shoulder to be accurately rendered within the virtual world irrespective of the differences between human anatomy and a fictional anatomy within the virtual world. The present technology also reduces the number of motion sensors required to track an arm with high fidelity.

An aspect of the present technology relates to determining the shoulder inversion factor in 3D space. A vector associated with a shoulder (e.g., corresponding to a clavicle) can be ascertained and a vector associated with an arm (e.g., corresponding to a humerus) can be ascertained. In one aspect, the shoulder inversion factor can be determined based on a difference between the normalized vectors. The difference of the normalized vector can be compared to a reference vector, such as a chest-up vector. For example, the shoulder inversion factor can be determined based on a dot product of the normalized vector and the reference vector, which identifies an amount in which the arm is folding into the shoulder. The mobility of the arm is limited within the shoulder joint and the shoulder inversion factor can identify that the mobility of the shoulder joint is employed to achieve a desired position.

Another aspect of the present technology relates to tracking the shoulder without a separate shoulder sensor. In one aspect, the tracking of the shoulder can occur to identify translation of the shoulder in space based on estimated position. In one aspect, the present technology can determine a shoulder position based on the height of the user, and determine a movement vector based on a shoulder position identified from sensor data received from an arm motion sensor attached to the user. When a vector that corresponds to the arm of the user does not indicate significant biasing of the shoulder, a movement vector of the shoulder can be identified and that movement vector can be scaled and applied to an avatar in the virtual world.

The present technology accurately tracks shoulder position based on biasing of the shoulder. For example, the inversion factor is correlated to the biasing of the shoulder and the combination of the shoulder inversion factor and tracking shoulder position allows accurate movement to be applied to the avatar in the virtual world. For example, complex non-verbal communication in the physical world (e.g., a shoulder shrug) can be detected and accurately reflected into the virtual world to increase immersive experiences.

FIG. 1 illustrates an example virtual world platform 102 for playing and hosting a multiplayer virtual reality (VR) experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first person inputs from a user of the client device 106 upon which client 104 is executing and handles third party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client 104 can download an instance of the virtual world by calling the worlds API 128, which can retrieve the virtual world from worlds world assets database 130 and send it to client 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics. In some embodiments the avatar assets include colliders and receivers defined on portions of the avatar, or a tree of transforms that cause portions of the avatar to exhibit secondary motion behaviors (e.g., dynamic or physics bones (aka phys. bones) are examples systems that can configure portions of the avatar to exhibit secondary motion behaviors).

The downloaded instance of the virtual world can be executed by client 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The client 104 can also support contact interactions between avatars, a portion of an avatar with another portion of the same avatar, or a portion of an avatar with an object in a virtual world. In order to detect these interactions, the client 104 can be configured to detect collisions between objects using the collision detection system 148. In some embodiments, the collision detection system 148 can be a broad phase collision detection system.

The current world 120 also has features that require networking. The current world 120 could have objects that a user can interact with and dynamically change aspects of the current world 120, and the object needs to broadcast its state across the network so that other users in the current world 120 can view the current state of the object. In one illustrative example, the current world 120 can include a light switch that dynamically affects a light source within the current 120, such as turning on or off the light.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking service such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered on the virtual world platform 102.

In some embodiments virtual world platform 102 can also include a simplified avatars service 146. As will be described herein, simplified avatars service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Figure 3:
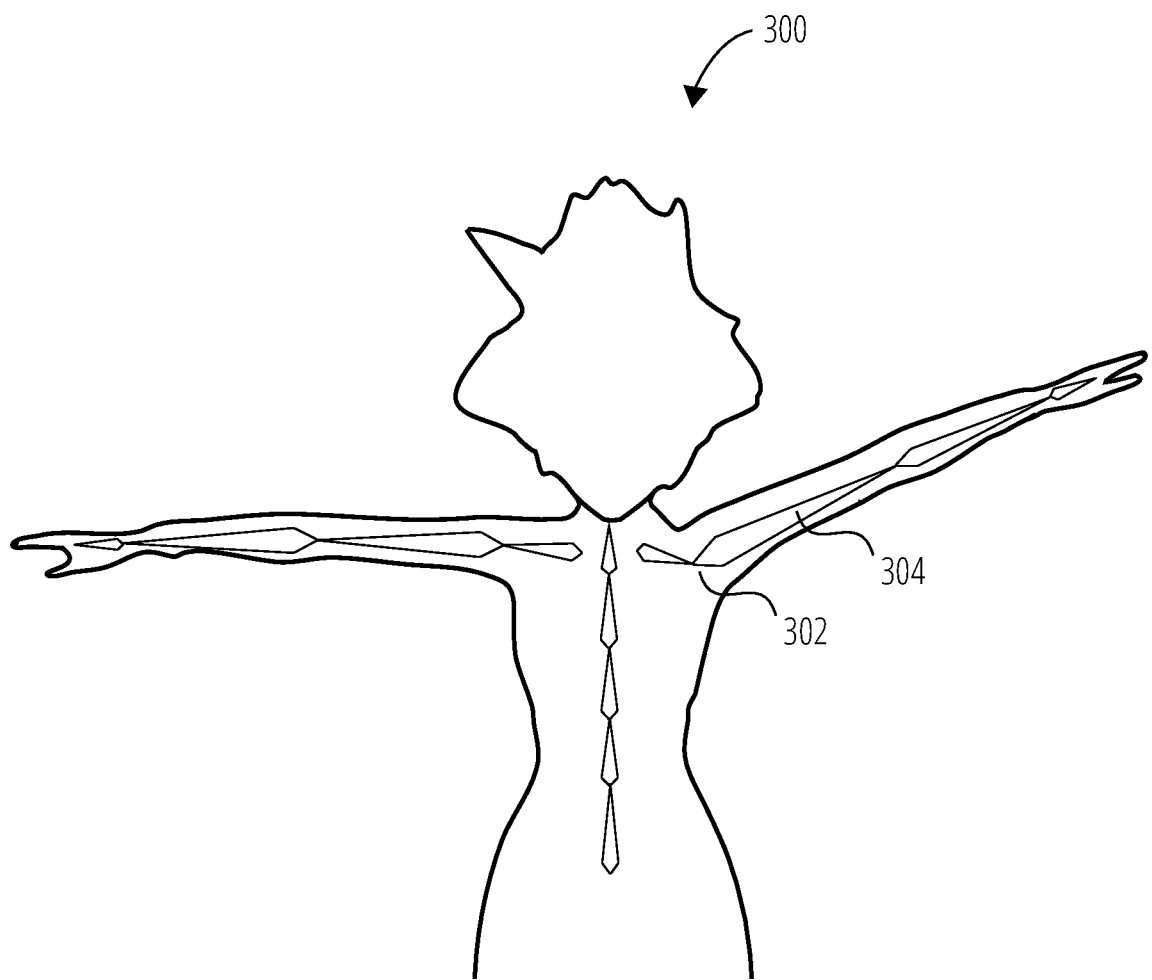
FIG. 3 illustrates an example of shoulder impingement that can occur in a virtual world that may have low visual fidelity based on tracking shoulder position of a person in the physical world, in accordance with some aspects of the disclosure.

FIG. 3 illustrates an example of shoulder impingement that can occur in a virtual world that may have low visual fidelity based on tracking a shoulder position of a person in the physical world, in accordance with some aspects of the disclosure. In FIG. 3, an avatar 302 is illustrated with a shoulder joint 302 that is impinged based on the physical movement of a user in the physical world. In this illustrative example, the person in the physical world may have a shoulder tracking sensor that is attached to their arm and positioned between their shoulder joint and elbow joint. The shoulder tracking sensor is associated with an embedded offset that maps to a position of the shoulder tracking sensor to the shoulder joint that causes the avatar's shoulder to when the user laterally abducts their arm. For example, the shoulder tracking offset can include As the person's shoulder abducts upward, the embedded offset causes the shoulder joint 302, the shoulder of the person rotates upward, which increases the rotation and the embedded mapping causes the shoulder joint 302 to rotate downward as illustrated in FIG. 3.

As a result of the downward rotation of the shoulder joint 302, the humerus 304 of the avatar 300 folds inwardly into the shoulder joint 302 that is anatomically impossible. In this case, the position of the humerus 304 in the shoulder joint 302 of the avatar 300 in FIG. 3 has low visual fidelity and intuitively looks incorrect. Animations of an avatar 300 into anatomically impossible positions have low visual fidelity because such animations reduce the immersive effect of the virtual world.

Although FIG. 3 illustrates an example of lateral abduction of the arm that results in inward folding of the arm and shoulder, this example also applies to other motions associated with the shoulder. For example, lateral adduction, which is the movement of a limb or other part toward the midline of the body or toward another part, can create other visual fidelity issues. The inward folding of the arm and shoulder can also occur as a result of anterior flexion (e.g., the forward raising of the shoulder), posterior extension (e.g., the movement of the shoulder behind the body), and other movements such as rotation of the humerus 304.

In some cases, the shoulder joint 302 can be tracked based on a motion tracking sensor that is directly attached to the shoulder and positioned to detect shoulder motion. A motion tracking sensor is disadvantageous because it incurs additional cost and is difficult to comfortably stably attach a separate sensor suitably close to the shoulder. For example, the motion tracking sensor could be attached using a band through the armpit, but the compression and decompression of the band due to the movement of the arm would be uncomfortable and would cause rotation of the motion tracking sensor.

FIG. 3 illustrates an example of shoulder impingement that can occur in a virtual world that may have low visual fidelity based on tracking a shoulder position of a person in the physical world, in accordance with some aspects of the disclosure. In FIG. 3, an avatar 302 is illustrated with a shoulder joint 302 that is impinged based on the physical movement of a user in the physical world. In this illustrative example, the person in the physical world may have a shoulder tracking sensor that is attached to their arm and positioned between their shoulder joint and elbow joint. The shoulder tracking sensor is associated with an embedded offset that maps to a position of the shoulder tracking sensor to the shoulder joint that causes the avatar's shoulder to when the user laterally abducts their arm. For example, the shoulder tracking offset can include As the person's shoulder abducts upward, the embedded offset causes the shoulder joint 302, the shoulder of the person rotates upward, which increases the rotation and the embedded mapping causes the shoulder joint 302 to rotate downward as illustrated in FIG. 3.

As a result of the downward rotation of the shoulder joint 302, the humerus 304 of the avatar 300 folds inwardly into the shoulder joint 302 in an anatomically impossible position. In this case, the position of the humerus 304 in the shoulder joint 302 of the avatar 300 in FIG. 3 has low visual fidelity and intuitively looks incorrect. Animations of an avatar 300 into anatomically impossible positions have low visual fidelity because such animations reduce the immersive effect of the virtual world.

Although FIG. 3 illustrates an example of lateral abduction of the arm that results in inward folding of the arm and shoulder, this example also applies to other motions associated with the shoulder. For example, lateral adduction, which is the movement of a limb or other part toward the midline of the body or toward another part, can create other visual fidelity issues. The inward folding of the arm and shoulder can also occur as a result of anterior flexion (e.g., the forward raising of the shoulder), posterior extension (e.g., the movement of the shoulder behind the body), and other movements such as rotation of the humerus 304.

In some cases, the shoulder joint 302 can be tracked based on a motion tracking sensor that is directly attached to the shoulder and positioned to detect shoulder motion. A motion tracking sensor is disadvantageous because it incurs additional cost and is difficult to comfortably and stably attach a separate sensor suitably close to the shoulder. For example, the motion tracking sensor could be attached using a band through the armpit, but the compression and decompression of the band due to the movement of the arm would be uncomfortable and would cause rotation of the motion tracking sensor.

Figure 2:
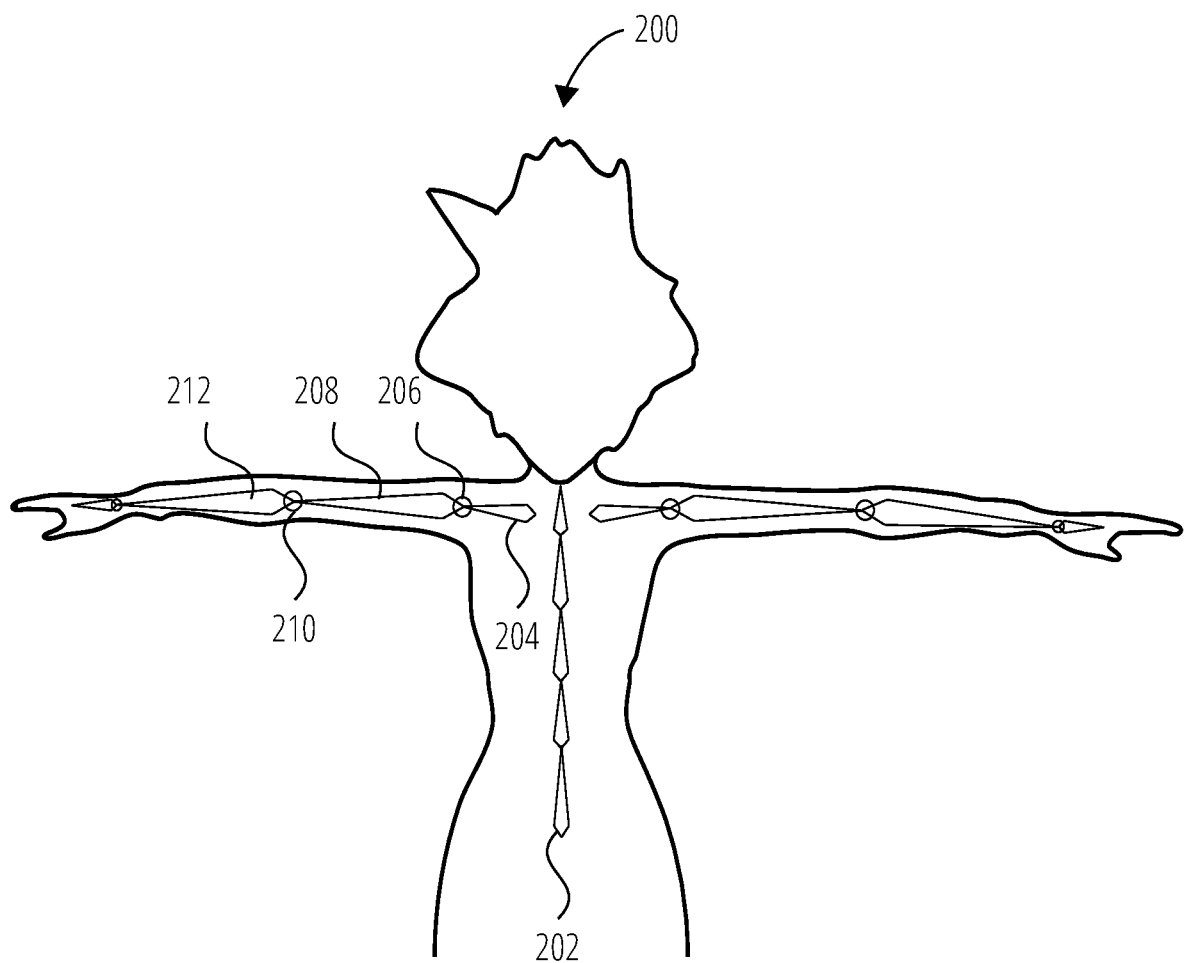
FIG. 2 illustrates a front view of an avatar that can be mapped to physical movements in the physical world in accordance with aspects of the disclosure.
Figure 4:
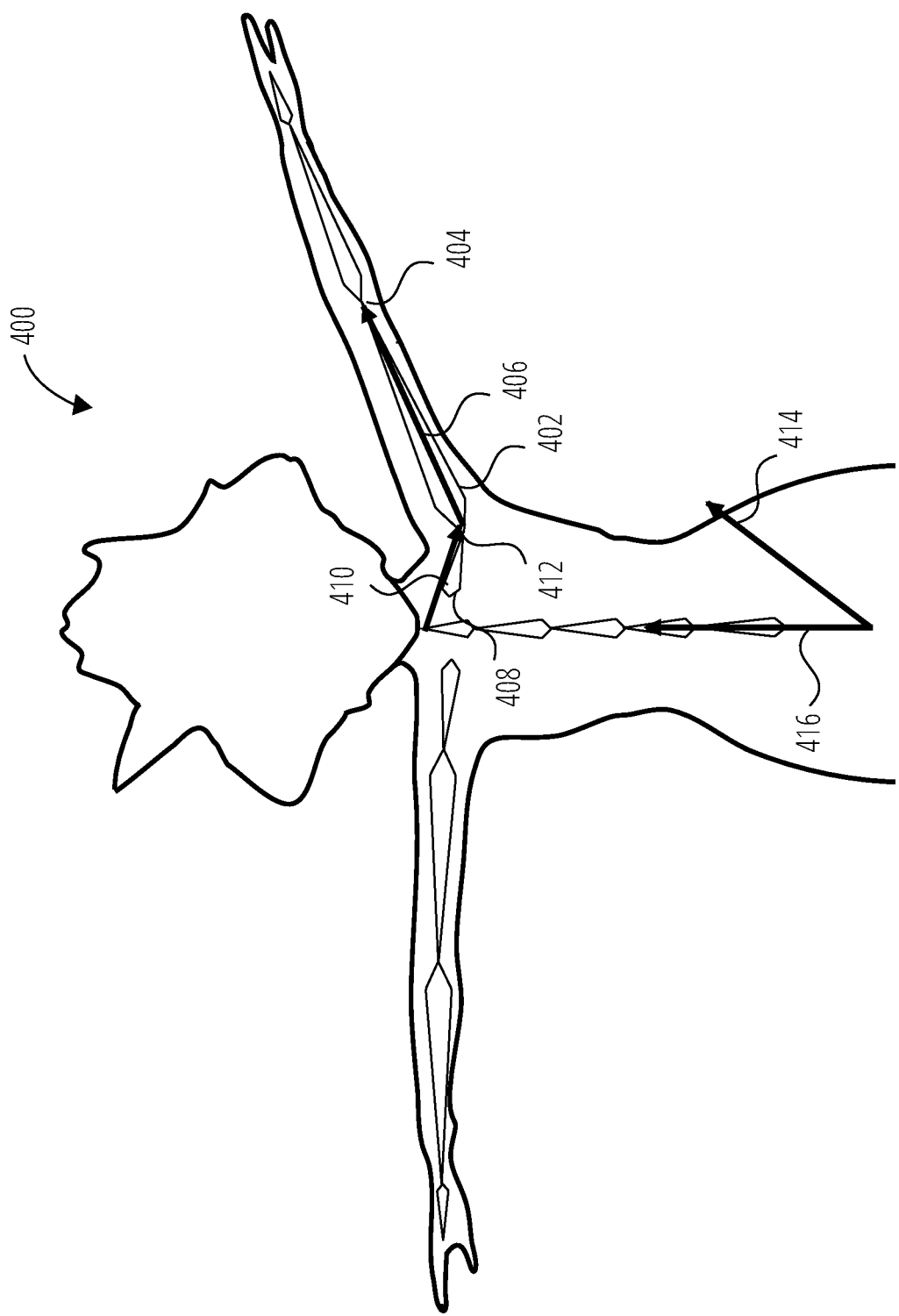
FIG. 4 illustrates a conceptual diagram of a technique to determine a shoulder inversion factor in accordance with some aspects.

FIG. 4 illustrates a conceptual diagram of a technique to determine a shoulder inversion factor in accordance with some aspects. The shoulder inversion factor determines a quantity that identifies an amount of impingement of the arm onto the shoulder. The shoulder inversion factor directly corresponds to the visual fidelity of the shoulder and the arm. For example, a shoulder inversion factor associated with the avatar of FIG. 2 identifies a high visual fidelity and a shoulder inversion factor associated with the avatar of FIG. 3 identifies a low visual fidelity. As will be described in detail with respect to FIGS. 4, 5, and 6, the shoulder inversion factor can be used to determine a blend factor between an untracked and a tracked shoulder. A tracked shoulder uses a position of a sensor to identify the position of the shoulder joint without an external library such as an IK solution, and an untracked shoulder uses information an external library, such as an IK solution, to identify a position of the shoulder joint. The external library can be implemented in various different manners, such as an interface that defines a contract (e.g., properties, functions, static functions, etc.) that an implementing object is required to implement. In another example, the external library can be extended using polymorphism to reuse instructions associated with a base class.

In the illustrative example of FIG. 4, an avatar 402 is configured to track a person's movements using an arm tracking sensor (not shown). The arm tracking sensor is attached to an upper arm (e.g., around a bicep and tricep), which corresponds to the humerus 402 in the physical world. In some aspects, a software application (e.g., a VR multiuser application) may be configured with information pertaining to the user, such as the user's height. The software application may have other relevant information such as a position of a VR controller that is being held by the person, and may have calibration information that identifies a position of the arm tracking sensor.

The software application is configured to receive sensor data from an arm tracking sensor and identify the position of the shoulder using a shoulder inversion factor. To determine a motion to display based on the arm tracking sensor, the software application determines the position of the arm tracking sensor, and extrapolates a position of an elbow joint 404. For example, the software application may be calibrated with information that can determine a shoulder width (e.g., a clavicle length) and a user height, and a position of the elbow joint uses a current position of a clavicle or the shoulder bone, and a position of the elbow joint 404 can be calculated based on average proportions based on shoulder width and height.

The software application can identify an elbow target vector 406 that begins on a point associated with a clavicle 408 and at the elbow joint 404. As illustrated in FIG. 4, the elbow target vector 406 intersects the clavicle at a mid-point, but other variations of the elbow target vector 406 are within the scope of this disclosure. The software application can also identify a shoulder target vector 410 that corresponds to the clavicle 408 and begins at a reference point, such as a specific point in a spine, and ends at a shoulder joint 412. An example of the elbow target vector 406 and the shoulder target vector 410 to determine the target vector 414 are illustrated herein with reference to FIG. 5.

In some aspects, the elbow target vector 406 and the shoulder target vector 410 are normalized and the software application can determine a target vector 414 that illustrates an amount of bending of the shoulder. The target vector 414 provides difference in the a directional relationship of the clavicle and the humerus and the target vector 414. In some aspects, the target vector 414 is compared to a chest-up vector, which is a reference vector that identifies an orientation of the spine, to determine the shoulder inversion factor. An illustrative example of a shoulder inversion factor is generated by computing a dot product of the the target vector 414 and the chest up vector 416. The dot product yields a single value that determines a relationship of the magnitude and angle between the target vector 414 and the chest up vector 416.

In some aspects, the calculation of the shoulder inversion factor can be controlled to limit a range of movement. For example, the shoulder inversion factor can be scoped to a particular shoulder movement range by offsetting the shoulder inversion factor with a fixed value to prevent negative shoulder inversion factors. The shoulder inversion factor can also be clamped to limit the value of the shoulder inversion factor to a maximum value. The clamp value can correspond to a maximum rotation range of the humerus 402 within the shoulder joint 412, and further movement can be achieved by causing rotation of the clavicle 408 to move the shoulder joint 412.

Although the avatar 400 depicts that a person is laterally abducting their arm, the shoulder inversion factor may also apply to other movements, such as lateral adduction, which is the movement of a limb or other part toward the midline of the body or toward another part. The shoulder inversion may also be used with anterior flexion (e.g., the forward raising of the shoulder), posterior extension (e.g., the movement of the shoulder behind the body), and other movements such as rotation.

Figure 5:
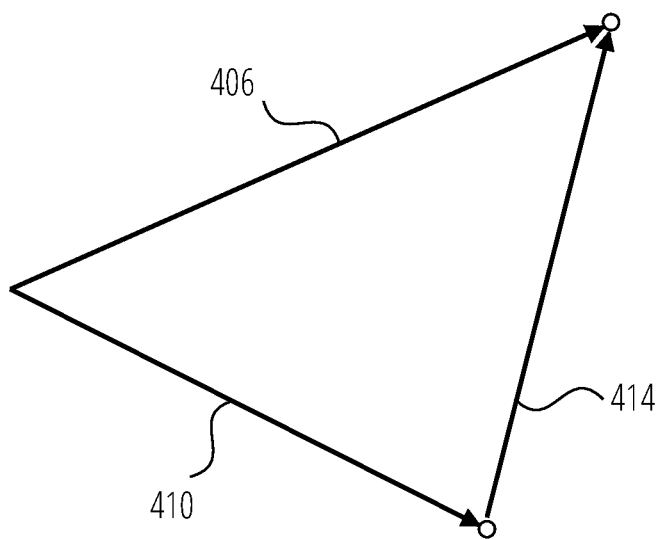
FIG. 5 illustrates an example of determining the target vector 414 that is used for computing a shoulder inversion factor in accordance with some aspects of the disclosure.

FIG. 5 illustrates an example of determining the target vector 414 that is used for computing a shoulder inversion factor in accordance with some aspects of the disclosure. The elbow target vector 406 and the shoulder target vector 410 are normalized into a unit space and aligned. The target vector 414 is determined based on a vector that begins at an endpoint of the elbow target vector 406 to an endpoint of the shoulder target vector 410.

Figure 6:
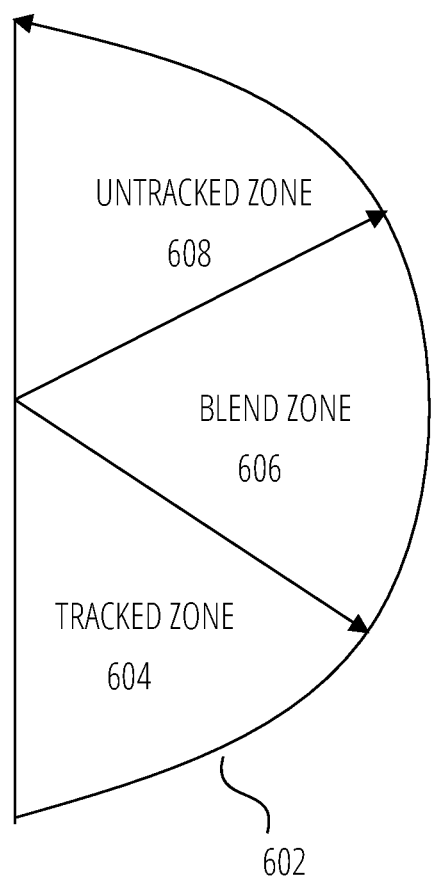
FIG. 6 illustrates various tracking regions for a shoulder in accordance with some aspects of the disclosure.

FIG. 6 illustrates various tracking regions for a body part in accordance with some aspects of the disclosure. In particular, FIG. 6 depicts different regions of lateral abduction based on the movement of a hand along a path 602 that begins from a neutral position. For example, the neutral position of the hand is placed by the waist of the person, with the arm being perpendicular and pointed toward the ground. In this position, the shoulder is deemed to be within a tracked zone 604, where the position of the shoulder of determined based on a motion tracking sensor that is attached to the person's arm. For example, in the tracked zone 604, the positions of the shoulder are determined directly from an embedded offset that is determined during the calibration of the motion tracking sensor.

As the user begins to laterally abduct (e.g., rotate their arm upward) to move their hand along the path 602, the movement of the shoulder enters a blend zone 606, which is configured to determine a position of the shoulder based on a combination of tracking associated with the motion tracking sensor on the person's arm and a calculated position. In some aspects, the position of the shoulder may be calculated based on varying factors, such as the proportions associated with the avatar using computational techniques, such as IK. For example, the position of the shoulder can be mapped to a position corresponding to the motion tracking sensor on the person's arm based on the shoulder width of the avatar.

In one illustrative example, the shoulder inversion factor can be used to interpolate the position determination based on the tracked position and the calculated position. As the person rotates their hand upwards within the blend zone 606, the shoulder inversion factor begins to increase and causes a positioning of the shoulder to be increasingly delegated to computational techniques, such as IK.

When the user continues laterally abducting their arm upwards into the untracked zone 608, the position of the shoulder is entirely determined based on the calculated position described above. Table 1 below illustrates code that can be used to determine a blending between a tracked shoulder and an untracked shoulder.

TABLE 1

```
ShoulderInversionFactor = DetermineShoulderInversionFactor
(sensorData, currentFrame)
if (ShoulderInversionFactor < 0.8) {
    ShoulderPosition = UseTrackedShoulderPosition(sensorData);
}
else if (ShoulderInversionFactor < 1.2) {
    var trackedPosition = UseCalculatedShoulderPosition(sensorData);
    var untrackedPosition = UseUntrackedSholderPosition(sensorData);
    ShoulderPosition = 5*(ShoulderInversionFactor – 08) *
    trackedPosition + (1.6-
ShoulderInversionFactor)* untrackedPosition
}
else {
    ShoulderPosition = UseCalculatedShoulderPosition(sensorData)
}
```

In this example illustrated in Table 1, the shoulder position is determined based on sensor data (sensorData) and the position of the shoulder within a current frame (currentFrame). When the shoulder inversion factor is greater than 0.8 and less than 1.2, the shoulder position is within the blend zone 606. The untracked position controls at lower shoulder inversion factors in the blend zone 606 based on offsets applied to the shoulder inversion factor. As the shoulder inversion factor increases, the tracked position is scaled based on a multiplication factor of 5 and begins to control as the shoulder inversion factor. In this case, as the shoulder factor changes, the position of the shoulder is interpolated between a tracked position and a calculated position.

Figure 7:
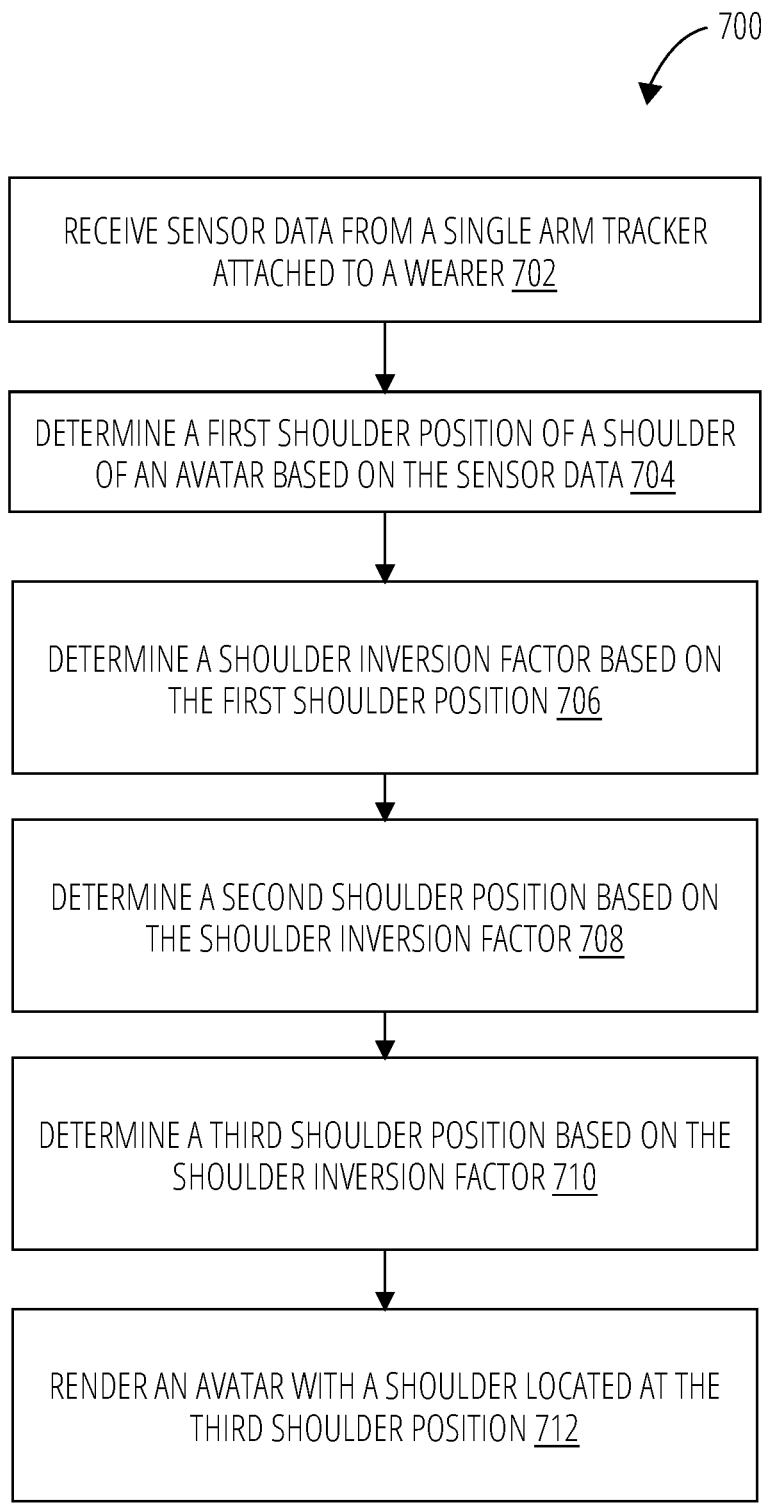
FIG. 7 illustrates an example method 700 for tracking a shoulder using a single arm motion sensor for rendering an avatar in a VR world.

FIG. 7 illustrates an example method 700 for tracking a shoulder using a single arm motion sensor for rendering an avatar in a VR world. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

The method 700 may be performed by a software application executing on a hardware device. For example, the software application may be a VR multiuser application that is executing on a head mounted device (HMD) device. In other aspects, the software application may be executed on a host computer and provided to a HMD device. The software application may also be executed on a mobile device, or another device that includes a computing system (e.g., computing system 1200) and is capable of rendering graphics and either displaying the graphics or providing the graphics to another device to display. Based on the input motion using a controller such as a VR controller, the HMD device may be configured to render the motion of an avatar within the VR multiuser application and display the motion to the wearer.

According to some examples, the method 700 includes receiving (e.g., by the HMD device) sensor data from an arm motion sensor attached to a wearer at block 702. The arm motion sensor comprises a single IMU that is bound to an arm of the wearer. For example, the arm motion sensor can include an arm strap for attachment to an arm between the deltoid and elbow. In some aspects, the HMD device may be configured to calibrate a position of the arm motion sensor and use the calibration information to determine directional and positional information associated with the arm.

According to some examples, the method 700 includes determining (e.g., by the HMD device) a first shoulder position of a shoulder of an avatar based on the sensor data at block 704. For example, using the calibration of the arm motion sensor, the HMD device can receive the motion data and determine a position of fixed points with respect to the sensor data. In some aspects, the determining of the first shoulder position may include determining an elbow position associated with an arm of the avatar based on the sensor data. In some aspects, the first shoulder position of the avatar is determined based on the elbow position. For example, using an embedded offset associated with the calibration, the shoulder position can be determined.

According to some examples, the method 700 includes determining (e.g., by the HMD device) a shoulder inversion factor based on the first shoulder position at block 706. The shoulder inversion factor identifies an impingement between a shoulder and an arm. The determining of the shoulder inversion factor comprises determining (e.g., by the HMD device) a first vector from a shoulder end point to an elbow position. For example, the first vector corresponds to the elbow target vector 406 illustrated in FIG. 4. The elbow target vector 406 in FIG. 4 can begin at any suitable point associated with a shoulder, such as the midpoint of the shoulder target vector 410.

Further, the determining of the shoulder inversion factor further comprises determining a second vector from the shoulder root position to a target point associated with the sensor data. For example, the second vector corresponds to a shoulder target vector 410 and begins at a fixed point associated with a body and extends in a direction based on a position of a clavicle.

Further, the determining of the shoulder inversion factor further comprises determining (e.g., by the HMD device) a third vector based on the first vector and the second vector. For example, as illustrated in FIG. 5, the first vector and the second vector can be normalized and a third vector can be configured to determine an orientation that identifies their different components.

Further, the determining of the shoulder inversion factor further comprises determining the shoulder inversion factor based on the third vector with respect to a reference vector. For example, a dot product of a chest-up vector, which identifies an orientation of the spine of a user, and the third vector identifies an amount of folding inward of the arm onto the shoulder. The dot product is used in this instance because it can convert 3D vectors into a value. In other aspects, the shoulder inversion factor can be determined based on measuring angles in at least one direction.

According to some examples, the method 700 includes, if the shoulder inversion factor exceeds a threshold, determining a second shoulder position based on the shoulder inversion factor at block 708. An example threshold is a value that is based on the computation of the various vectors, which can be in 3D. Examples of a threshold are illustrated above in Table 1. In some aspects, the second shoulder position is an untracked position that uses another computational method to identify the second shoulder position. In some aspects, the method 700 can include determining a second shoulder position based on a maximum shoulder inversion factor. In some aspects, a maximum shoulder inversion factor corresponds to a substantially maximum rotation capable within the shoulder joint, and further movement is primarily based on the further rotation of a clavicle. For example, when a user's arm rotates over the shoulder, the impingement of the shoulder onto the arm forces the shoulder to move if the user continues rotation. Detection of impingement may indicate that the shoulder joint may move more within a particular region because the shoulder joint has limited rotation capabilities, and rotating the shoulder to move the shoulder joint may be used to achieve the desired arm position.

In some aspects, the movement of the arm can be in multiple directions. Although lateral abduction is illustrated, the movement of the arm with respect to the shoulder can be lateral adduction, anterior flexion, and posterior extension. In some cases, lateral rotation and medial rotation of the humerus can affect the shoulder position depending on the shoulder inversion factor. For example, medial rotation of the humerus with a shoulder position having a low shoulder inversion factor does not affect the position of the shoulder, but medial rotation of the humerus can cause the shoulder to rotate forward when positioned with a high shoulder inversion factor.

Further, the method 700 comprises blending (e.g., by the HMD) the first shoulder position and the second shoulder position based on the shoulder inversion factor. As noted above, if the shoulder inversion factor is less than a first threshold (e.g., 0.8 in Table 1), the second shoulder position may not be computed. If the shoulder inversion factor is greater than a second threshold, the method may only use the second shoulder position. However, if the shoulder inversion factor is between the first threshold and the second threshold (e.g., 0.8<shoulder inversion factor<1.2), the HMD may interpolate a position of the shoulder based on the shoulder inversion factor, the first shoulder position, and the second shoulder position.

According to some examples, the method includes rendering (e.g., by the HMD device) an avatar with a shoulder located at the third shoulder position at block 712. The blending of the shoulder position enables a smooth transition between a fully user-tracked shoulder and a calculated shoulder position. Irrespective of the differences between the avatar geometries and physical world anatomy, the shoulder position of the avatar within the virtual world can be determined with high fidelity. High-fidelity animations within the virtual world increase the immersive effects of the virtual world and keep users engaged. Inaccurate animations, such as impossible and anatomically incorrect positions of a shoulder and arm, reduce the immersion and detriment the user experience.

Figure 8:
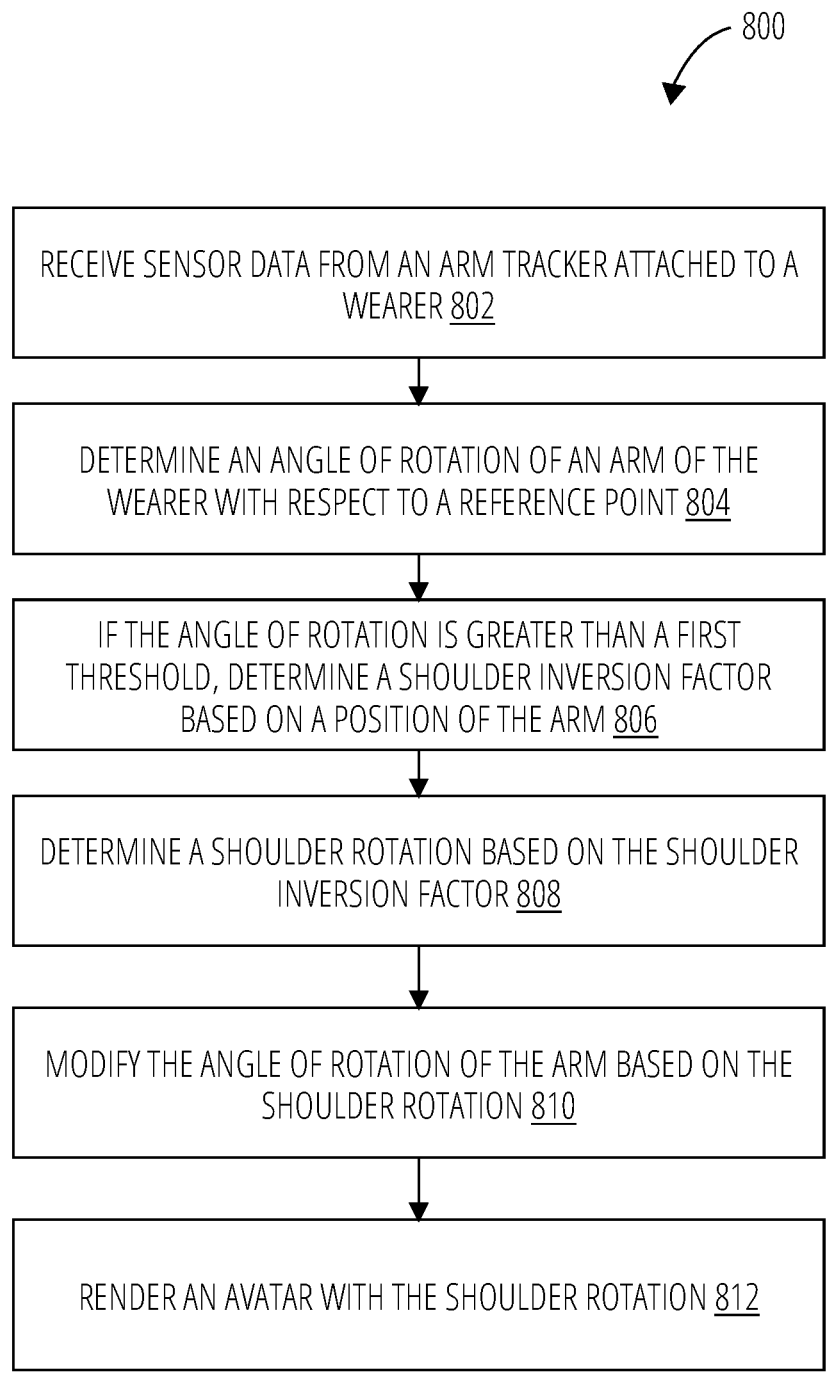
FIG. 8 illustrates another example method 700 for tracking a shoulder using a single arm motion sensor for rendering an avatar in a VR world.

FIG. 8 illustrates another example method 800 for tracking a shoulder using a single arm motion sensor for rendering an avatar in a VR world. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

The method 800 may be performed by a software application executing on a hardware device. For example, the software application may be a VR multiuser application that is executing on an HMD device. The software application may also be executed on a mobile device, or another device that includes a computing system (e.g., computing system 1200) and is capable of rendering graphics and either displaying the graphics or providing the graphics to another device to display. Based on the input motion using a controller such as a VR controller, the HMD device may be configured to render the motion of an avatar within the VR multiuser application and display the motion to the wearer.

According to some examples, the method 800 includes receiving sensor data from an arm motion sensor attached to a wearer at block 802. As noted above with respect to FIG. 7, the arm motion sensor can include an arm strap to attach the arm motion sensor to a wearer and track an arm position. In one illustrative aspect described below, a single arm motion sensor can be configured to track a position of the shoulder without requiring a separate shoulder position.

According to some examples, the method 800 includes determining an angle of rotation of an arm of the wearer with respect to a reference point at block 804. As described in detail above, the shoulder rotation comprises at least one of abduction, adduction, flexion, or extension of the arm. In some aspects, the reference point can be a determined position associated with a shoulder joint, and can be determined based on a setting associated with the VR world. For example, the wearer can provide their physical height as a setting for the VR world, and the position of the reference point can be determined as part of a calibration process.

According to some examples, the method 800 includes determining a shoulder inversion factor based on a position of the arm with respect to a shoulder at block 806. The determining of the shoulder inversion factor includes computing a location of the shoulder based on a position of an elbow. For example, as illustrated in FIG. 4, the shoulder target vector and the elbow target vector can be used to determine a target vector that is used to compute the shoulder inversion factor. Detailed examples of determining the shoulder inversion factor are described above in FIG. 7.

According to some examples, the method 800 includes determining a shoulder rotation based on the shoulder inversion factor at block 808. For example, the method 800 can determine that, based on an amount of rotation in at least one direction, the shoulder is displaced due to the shoulder movement. The shoulder rotation may comprise circumferential movement of a shoulder joint with respect to a fixed point. For example, the shoulder joint can radially move based on an initial fixed point associated with a clavicle.

According to some examples, the method 800 includes modifying the angle of rotation of the arm based on the shoulder rotation at block 810. For example, the method 800 initially determines that the arm is rotated, but rotation of the shoulder joint occurs. Adding shoulder joint movement amplifies the rotation of the arm, and the arm position may be modified based on the shoulder joint movement.

According to some examples, the method 800 includes rendering an avatar with the shoulder rotation at block 812. In some aspects, the rendering of the avatar can also include other associated motion that can be ascertained at least in part from determining an arm movement vector of an arm position of the user using the sensor data, wherein rendering of the avatar includes rendering a corresponding arm of the avatar based on the arm movement vector The example method 800 is another technique that can be employed to identify a position of the shoulder using rotational angles around at least one axis. Other types of methods of determining shoulder impingement may use a shoulder inversion factor to determine that the shoulder appearance has low fidelity. In some aspects, software instructions to determine that the shoulder appearance has low fidelity may be logical operations and an expression of low fidelity is inherent within the software instructions.

Figure 9:
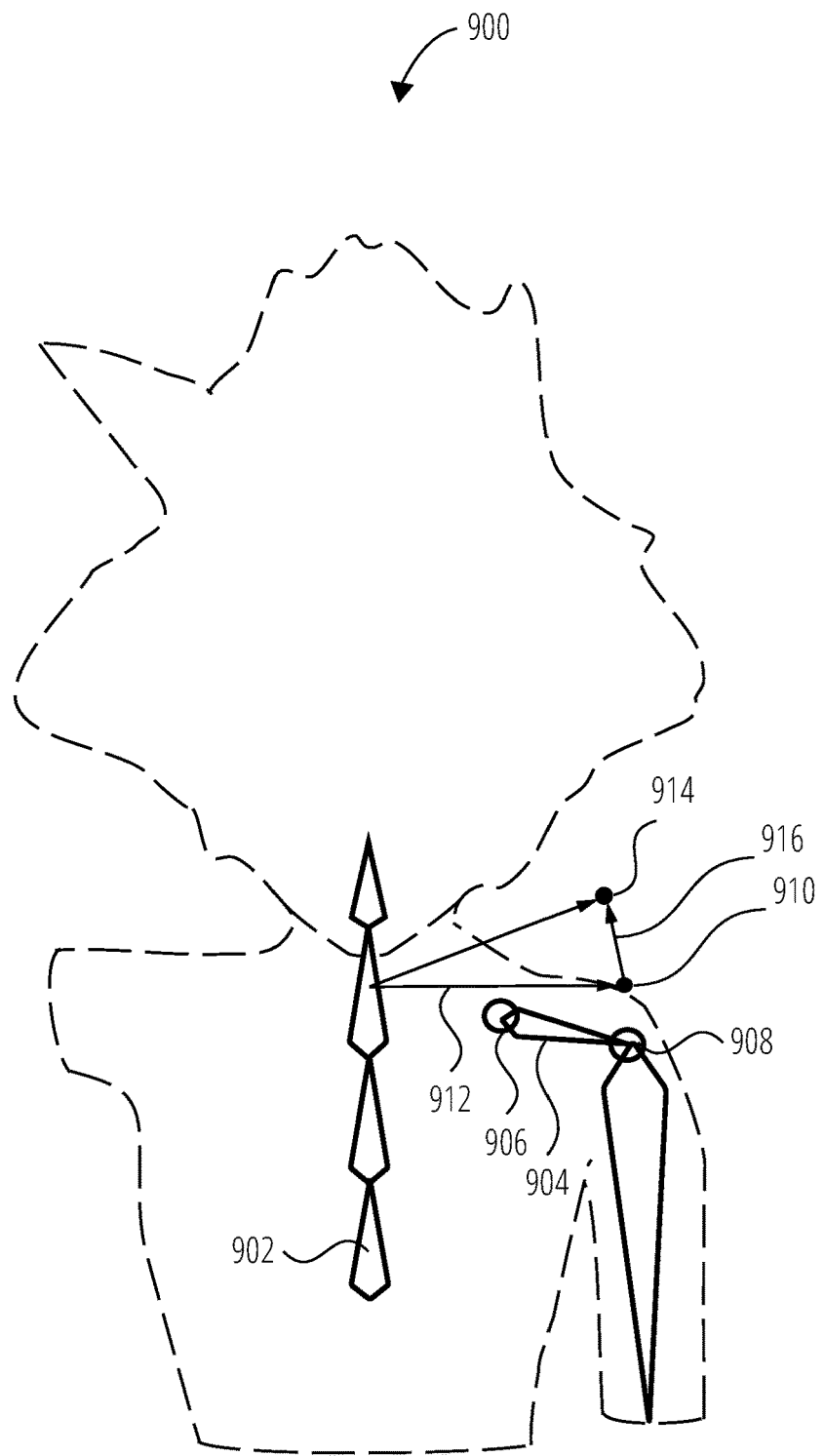
FIG. 9 illustrates an aspect of the subject matter in accordance with one embodiment.

FIG. 9 illustrates a conceptual diagram of an avatar that is configured to use a tracking solution to map human movements in the physical world to avatar movements in the virtual world in accordance with some aspects of the disclosure. As illustrated in FIG. 9, an avatar 900 approximates can approximate the physical dimensions of a person, and includes properties that are related to corresponding properties of a person in the physical world. In particular, the avatar includes a spinal object 902 that corresponds to a spine of a person and a clavicle object 904 that corresponds to a clavicle of a person. In this case, the clavicle object 904 approximates the clavicle of a person and does not precisely correspond to a human clavicle as the clavicle object 904 is fixed to a fixed point 906 that forms the basis of movement of the shoulder joint 908. Other avatars can have different proportions, such as a clavicle having a fixed point 906 attached to the spinal object 902.

In some aspects, the tracking of the shoulder of the avatar is identified based on an average height of the user. For example, the VR multiuser application can have a setting that enables a person to enter a height. In other examples, the VR multiuser application may be able to estimate the height of the user during a sensor calibration, such as with external or internal sensors of an HMD. An HMD can include a number of sensors, such as a dot projection sensor, that can measure a distance to an object. Based on the height of the user, an estimated neutral shoulder position 910 may be determined using a median value associated with that particular height and the estimated neutral shoulder position is substantially equal to a median shoulder position of a person having the same height. In this case, substantially equal means the values are almost identical for the purpose of the value.

A neutral position is the posture the human body naturally assumes in microgravity and adopting any other posture while floating requires muscular effort. For example, the neutral shoulder position corresponds to each arm placed at the waist of the user. An estimated shoulder vector 912 can be determined from a point on the spine to the estimated neutral shoulder position 910.

The tracking of the shoulder can include determining a biased shoulder position 914 associated with the sensor data that the user is wearing. Based on the biased shoulder position 914 in the physical world, a shoulder movement vector is determined that identifies movement of the shoulder with respect to the fixed point 906. A displacement vector 916 from the estimated shoulder vector 912 to the estimated neutral shoulder position 910 can be determined that estimates the amount of movement of the person's shoulder. In another aspect, the rotation of the clavicle object 904 can be determined in at least one direction.

In some aspects, the clavicle object 904 does not directly correspond to the same movement associated in the physical world based on the approximated differences. Avatars within the virtual world cannot be guaranteed to correspond to a human clavicle because the avatars themselves are created by other content creators (e.g., users of the VR multiuser application). For example, as illustrated in FIG. 9, the fixed point 906 is offset from the center of the avatar 900 and the clavicle object 904 is significantly smaller than a human clavicle and would be unable to move according to the estimated shoulder vector 912.

To accommodate these differences, the movement of the clavicle object 904 can be scaled based on a ratio. An example ratio can be determined based on a length of the clavicle object 904 compared to the estimated neutral shoulder position 910, and the movement of the clavicle object 904 can be scaled based on this example ratio. For example, the clavicle object 904 is presumed to be half of the length of the estimated neutral shoulder position 910 with a ratio of 0.5, and movement of the clavicle object 904 is scaled by dividing the rotation with the ratio. In other examples, the displacement vector 916 can be multiplied by the ratio and the scaled displacement vector 916 is applied to the shoulder joint 908, which causes the shoulder joint 908 to move an amount that corresponds to the displacement vector 916 in the physical world.

In some aspects, the scaling of the displacement vector 916 can enable shoulder movement that is translational, such as a shoulder shrug, and prevent unnecessary movement of the arms that can occur in an IK solution. For example, an IK solution may determine that the arms abduct during a shrug. IK solutions were primarily designed with gaming functions and may not apply realistic limitations to animations, which can lead to effects that appear unrealistic or positioned in a manner that does not correspond to the user's motions. Further, because differences in the avatar and the physical world, the movement does not directly translate and the non-verbal expressions (e.g., a shoulder shrug) performed in the physical world may not translate into the virtual world.

Figure 10:
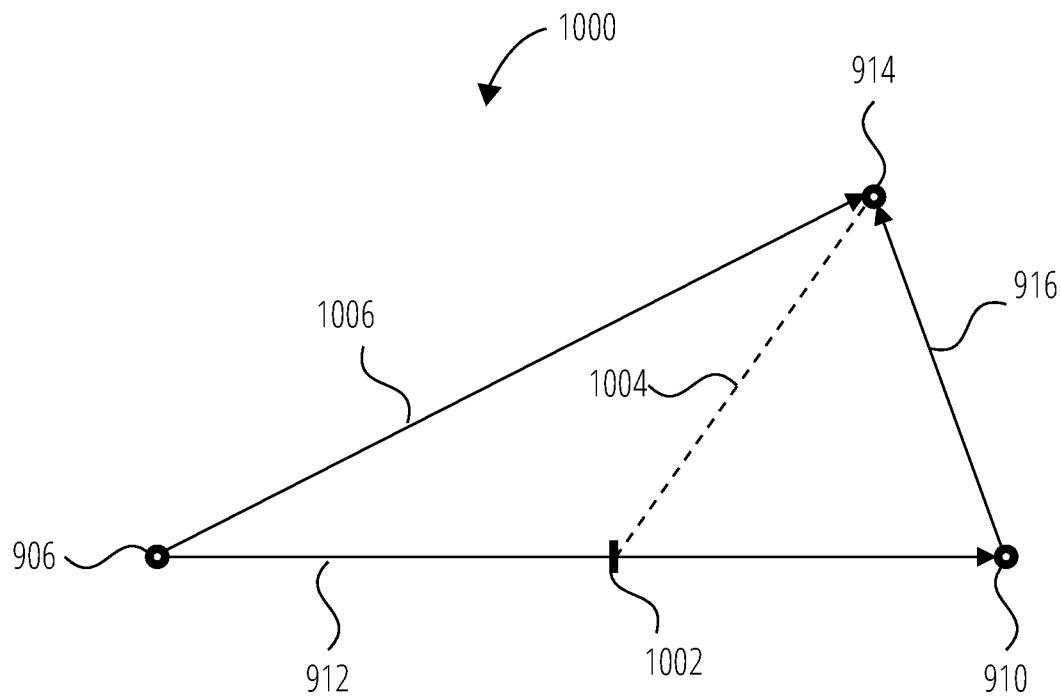
FIG. 10 illustrates an aspect of the subject matter in accordance with one embodiment.

FIG. 10 illustrates a conceptual diagram that illustrates mapping a shoulder joint 1002 of an avatar (e.g., avatar 900) based on arm motion tracker in accordance with some aspects of the disclosure. As described above with reference to FIG. 9, an estimated neutral shoulder position 910 is mapped based on an input height of the user or a determined height of the user. An arm motion sensor is configured to provide sensor data to a client device (e.g., the client device 106) that is executing a VR multiuser application that includes VR tracking services (e.g., VR tracking service 114).

When the user moves the arm motion sensor and the client device identifies the biased shoulder position 914, the client device is configured to identify movement information such as the displacement vector 916. The client device is configured to determine a ratio for scaling the displacement vector 916 and map the movement of the avatar shoulder joint 1002 to the biased shoulder position 914 within the virtual world. As illustrated in FIG. 10, the movement information can be a scaled avatar movement vector 1004 that is scaled based on the avatar shoulder joint 1002, and maps the movement of the clavicle object 904 into the virtual world. As described above with reference to FIG. 9, the clavicle object associated with the avatar has different properties, and the ratio enables the client device to map the movement of the user in the physical world to the avatar in the virtual world.

In another example, the movement information can be determined based on an angle between the estimated shoulder vector 912 and a target vector 414 that is associated with the biased shoulder position 914.

The avatar shoulder joint 1002 is illustrated on the estimated shoulder vector 912 for illustrative purposes to demonstrate that the movement within the virtual world is mapped to the physical world but the avatar shoulder joints 1002 can be at a different point in the virtual world as illustrated in FIG. 9. Further, FIGS. 9 and 10 illustrate movement of the shoulder in a single direction, but the shoulder can move (e.g., translate) in multiple directions and can rotate along multiple axes (e.g., abduction, flexion).

Figure 11:
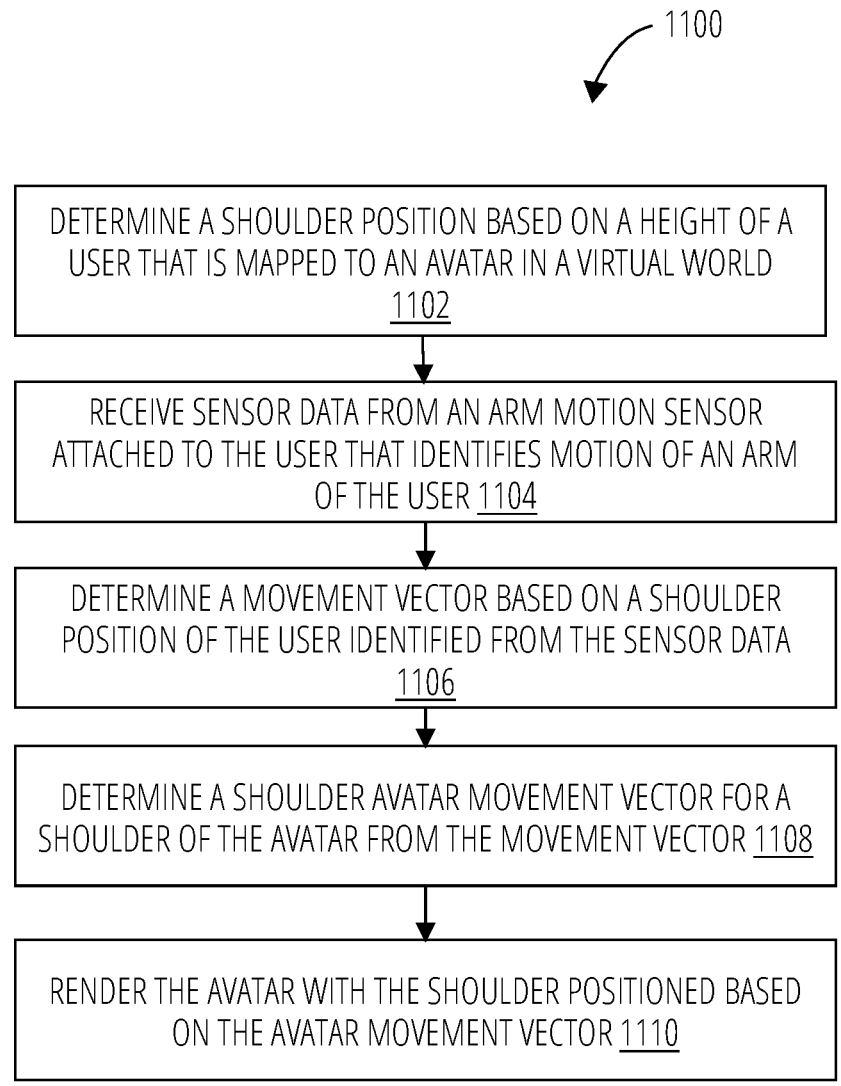
FIG. 11 illustrates an aspect of the subject matter in accordance with one embodiment.

FIG. 11 illustrates an example method 1100 for tracking a shoulder without the use of an IK library in accordance with some aspects of the disclosure. Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence.

The method 1100 may be performed by a software application executing on a hardware device. For example, the software application may be a VR multiuser application that is executing on an HMD device. The software application may also be executed on a mobile device, or another device (e.g., client device 106) that includes a computing system (e.g., computing system 1200) and is capable of rendering graphics and either displaying the graphics or providing the graphics to another device to display. Based on the input motion using a controller such as a VR controller, the HMD device may be configured to render the motion of an avatar within the VR multiuser application and display the motion to the wearer.

According to some examples, the method 1100 includes determining (e.g., by an HMD device) a shoulder position based on a height of a user at block 1102. The shoulder position is mapped to an avatar in a virtual world. In one aspect, the determining of the shoulder position is based on sensor data that is received from an external sensor such as an arm motion sensor. In the event that the method is tracking another body part, the method 1100 would include receiving data from a corresponding motion sensor. For example, if the method is tracking a hip of the user, the motion sensor may be attached to the hip or proximate to the hip (e.g., attached to the thigh).

Further, the determining of the shoulder position may include determining (e.g., by an HMD device) a shoulder vector from a point on a spine to an estimated neutral shoulder position that corresponds to a height of the user. The estimated neutral shoulder position may be substantially equal to a median shoulder position of a person having the same height. It is noted that the median shoulder position can vary based on the source and is an approximation of the location of the user's shoulder. In one illustrative example, the shoulder position may correspond to a point on a surface of a person's skin and does not precisely correspond to the shoulder joint. An estimated neutral shoulder vector may be determined from a point along a central axis along the person's spine to the estimated shoulder vector.

In one illustrative aspect, the user of the HMD device may input information corresponding that can be used to determine the shoulder position. For example, the VR multiuser application may include a setting for the user to enter their height. In other aspects, the HMD device or another sensor can determine the height of the user. For example, the user may wear the HMD device and calibrate the device based on detection of various objects and positions. During calibration, the HMD can include identifying a shortest vector to a ground plane, which may correspond to the user's height. In another aspect, an external sensor (e.g., Microsoft Kinect) may determine the user's height.

The shoulder position may be determined based on a median height of the user. In the case of an external sensor, the external sensor can identify an eye position and determine a height and a position of the shoulders based on median information.

According to some examples, the method 1100 includes receiving sensor data from an arm motion sensor attached to a wearer at block 1104. The sensor data identifies the motion of an arm of the user. The calibration of the arm motion sensor (or another motion sensor such as a thigh motion sensor) can determine a calibration offset associated with a joint or other information, and can be used to identify a position on the arm in space.

According to some examples, the method 1100 includes determining (e.g., by an HMD device) the shoulder position based on the sensor data at block 1106. For example, the HMD device may determine the shoulder position based on an offset that is determined during calibration.

According to some examples, the method 100 includes determining (e.g., by an HMD device) a movement vector based on the shoulder position and the sensor data at block 1106. For example, the movement vector can be determined based on a point on a spine towards the biased shoulder position 914, as illustrated in FIGS. 9 and 10. In one aspect, the determine the movement vector can be based on an estimated shoulder position associated with the sensor data. For example, the HMD device may determine a movement vector from the point on the spine to an estimated shoulder position associated with the sensor data.

According to some examples, the method includes determining (e.g., by an HMD device) an avatar movement vector associated with the avatar from the movement vector at block 1108. For example, the avatar movement vector corresponds to the displacement vector 916 in FIGS. 9 and 10 and identify movement of the shoulder in space in the virtual world based on scaling motion in the physical world. Further, the determining of the scaled avatar movement vector at block 1108 may include determining a ratio of an avatar shoulder to the shoulder vector. The avatar movement vector is determined based on scaling the shoulder vector based on the ratio. For example, the avatar movement vector may correspond to the scaled avatar movement vector 1004, which is a scaled version of target vector 1006 based on a ratio of the estimated shoulder vector 912 to a length of a clavicle object (e.g., clavicle object 904). In one illustrative aspect, the HMD may determine an avatar movement vector for a clavicle of the avatar from the movement vector. Because the clavicle of the avatar does not correspond to human proportions or may be modeled differently (e.g., a root position or a fixed position of the clavicle is not anatomically possible), the scaled version of the target vector 1006 may cause displacement in the virtual world that corresponds to physical movement in the physical world.

According to some examples, the method includes rendering the avatar with the shoulder positioned based on the avatar movement vector at block 1110. In some aspects, the shoulder joint can move differently based on the biasing of the shoulder. For example, in the event that a single shoulder is biased (e.g., raised during a shrug) with the arm in a neutral position (e.g., not raised), the position of the shoulder joint is relatively stable and does not significantly change position when the arm is then raised (e.g., abduction or flexion). However, when the shoulder is not biased and in a neutral position, raising the arm can cause significant shoulder movement. The combination of the tracking based on median shoulder position and impingement detection (e.g., the shoulder inversion factor) enables accurate tracking of the arm and shoulder, and accurately maps physical movements into the virtual world. For example, the movement in the physical world accurately scales into the virtual world and intended non-verbal communications can be accurately expressed.

Figure 12:
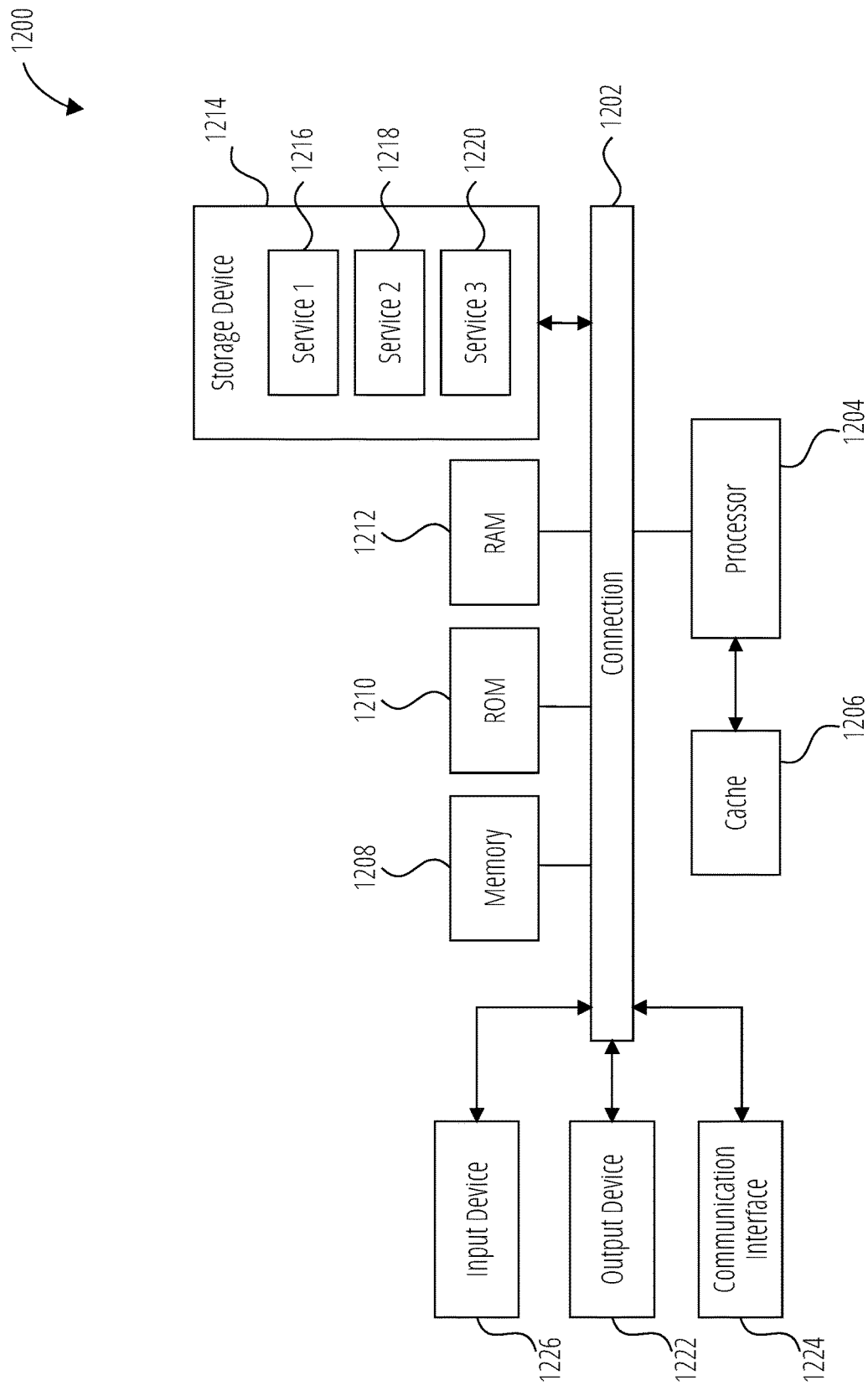
FIG. 12 shows an example of a system for implementing certain aspects of the present technology.

FIG. 12 shows an example of computing system 1200, which can be for example any computing device making up client device 106, or web services 110, or any component thereof in which the components of the system are in communication with each other using connection 1202. Connection 1202 can be a physical connection via a bus, or a direct connection into processor 1204, such as in a chipset architecture. Connection 1202 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1200 includes at least one processing unit (CPU or processor) 1204 and connection 1202 that couples various system components including system memory 1208, such as read-only memory (ROM) 1210 and random access memory (RAM) 1212 to processor 1204. Computing system 1200 can include a cache of high-speed memory 1206 connected directly with, in close proximity to, or integrated as part of processor 1204.

Processor 1204 can include any general purpose processor and a hardware service or software service, such as services 1216, 1218, and 1220 stored in storage device 1214, configured to control processor 1204 as well as a special-purpose processor where software instructions are incorporated into the actual processor design. Processor 1204 may essentially be a completely self-contained computing system, containing multiple cores or processors, a bus, memory controller, cache, etc. A multi-core processor may be symmetric or asymmetric.

To enable user interaction, computing system 1200 includes an input device 1226, which can represent any number of input mechanisms, such as a microphone for speech, a touch-sensitive screen for gesture or graphical input, keyboard, mouse, motion input, speech, etc. Computing system 1200 can also include output device 1222, which can be one or more of a number of output mechanisms known to those of skill in the art. In some instances, multimodal systems can enable a user to provide multiple types of input/output to communicate with computing system 1200. Computing system 1200 can include communication interface 1224, which can generally govern and manage the user input and system output. There is no restriction on operating on any particular hardware arrangement, and therefore the basic features here may easily be substituted for improved hardware or firmware arrangements as they are developed.

Storage device 1214 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1214 can include software services, servers, services, etc., that when the code that defines such software is executed by the processor 1204, it causes the system to perform a function. In some embodiments, a hardware service that performs a particular function can include the software component stored in a computer-readable medium in connection with the necessary hardware components, such as processor 1204, connection 1202, output device 1222, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative aspects of the disclosure include: Aspect 1. A method, comprising: determining a shoulder position based on a height of a user, wherein the shoulder position is mapped to an avatar in a virtual world; receiving sensor data from an arm motion sensor attached to the user, wherein the sensor data identifies motion of an arm of the user; determining a movement vector of the shoulder position of the user using the sensor data; determining a shoulder avatar movement vector for a shoulder of the avatar from the movement vector; and rendering the avatar with the shoulder positioned based on the shoulder avatar movement vector.

Aspect 2. The method of Aspect 1, wherein determining the shoulder position comprises: determining a shoulder vector from a point on a spine to an estimated neutral shoulder position that corresponds to the height of the user; determining the movement vector from the point on the spine to an estimated shoulder position associated with the sensor data; and determining the shoulder avatar movement vector based on the movement vector for an object, wherein the shoulder avatar movement vector is applied to an object of the avatar corresponding to a clavicle.

Aspect 3. The method of any of Aspects 1 to 2, wherein determining the shoulder avatar movement vector comprises: determining a ratio of the shoulder vector to the object of the avatar corresponding to the clavicle, wherein the shoulder avatar movement vector is determined based on scaling the shoulder vector based on the ratio.

Aspect 4. The method of any of Aspects 1 to 3, wherein the shoulder avatar movement vector is determined based on a maximum rotation of the object of the avatar corresponding to the clavicle.

Aspect 5. The method of any of Aspects 1 to 4, further comprising: receiving the height of the user from an input.

Aspect 6. The method of any of Aspects 1 to 5, further comprising determining the height of the user during calibration of the arm motion sensor.

Aspect 7. The method of any of Aspects 1 to 6, wherein the estimated neutral shoulder position is substantially equal to a median shoulder position of a person having the same height.

Aspect 8. The method of any of Aspects 1 to 7, further comprising: determining an inversion factor associated with the shoulder position; when the inversion factor is greater than a minimum threshold, determining a first shoulder position based on inverse kinematics; and blending the first shoulder position, the shoulder avatar movement vector, and the inversion factor to yield a blended shoulder position, wherein the shoulder of the avatar is to be rendered at the blended shoulder position.

Aspect 9. The method of any of Aspects 1 to 8, further comprising: determining an arm movement vector of an arm position of the user using the sensor data, wherein rendering of the avatar includes rendering a corresponding arm of the avatar based on the arm movement vector.

Aspect 10. The method of any of Aspects 1 to 9, further comprising: receiving second sensor data from a second sensor associated with the arm position of the user; determining a forearm movement vector associated with the second sensor and an elbow position, wherein the elbow position is at least partially determined based on the arm motion sensor, and wherein rendering of the avatar includes rendering a corresponding forearm of the avatar based on the forearm movement vector.

Aspect 11. The method of any of Aspects 1 to 10, wherein the second sensor is integral to a controller that is held by the user.

Aspect 12. The method of any of Aspects 1 to 11, wherein the second sensor is integral to a device that is attached to a wrist of the user.

Aspect 13. A system includes a storage (implemented in circuitry) configured to store instructions and a processor. The processor configured to execute the instructions and cause the processor to: determine a shoulder position based on a height of a user, wherein the shoulder position is mapped to an avatar in a virtual world; receive sensor data from an arm motion sensor attached to the user, wherein the sensor data identifies motion of an arm of the user; determine a movement vector of the shoulder position of the user using the sensor data; determine a shoulder avatar movement vector for a shoulder of the avatar from the movement vector; and render the avatar with the shoulder positioned based on the shoulder avatar movement vector.

Aspect 14. The system of Aspect 13, wherein the processor is configured to execute the instructions and cause the processor to: determine a shoulder vector from a point on a spine to an estimated neutral shoulder position that corresponds to the height of the user; determine the movement vector from the point on the spine to an estimated shoulder position associated with the sensor data; and determine the shoulder avatar movement vector based on the movement vector for an object, wherein the shoulder avatar movement vector is applied to an object of the avatar corresponding to a clavicle.

Aspect 15. The system of any of Aspects 13 to 14, wherein the processor is configured to execute the instructions and cause the processor to: determine a ratio of the shoulder vector to the object of the avatar corresponding to the clavicle, wherein the shoulder avatar movement vector is determined based on scaling the shoulder vector based on the ratio.

Aspect 16. The system of any of Aspects 13 to 15, wherein the shoulder avatar movement vector is determined based on a maximum rotation of the object of the avatar corresponding to the clavicle.

Aspect 17. The system of any of Aspects 13 to 16, wherein the processor is configured to execute the instructions and cause the processor to: receive the height of the user from an input.

Aspect 18. The system of any of Aspects 13 to 17, wherein the processor is configured to execute the instructions and cause the processor to: determine the height of the user during calibration of the arm motion sensor.

Aspect 19. The system of any of Aspects 13 to 18, wherein the estimated neutral shoulder position is substantially equal to a median shoulder position of a person having the same height.

Aspect 20. The system of any of Aspects 13 to 19, wherein the processor is configured to execute the instructions and cause the processor to: determine an inversion factor associated with the shoulder position; when the inversion factor is greater than a minimum threshold, determine a first shoulder position based on inverse kinematics; and blend the first shoulder position, the shoulder avatar movement vector, and the inversion factor to yield a blended shoulder position, wherein the shoulder of the avatar is to be rendered at the blended shoulder position.

Aspect 21. The system of any of Aspects 13 to 20, wherein the processor is configured to execute the instructions and cause the processor to: determine an arm movement vector of an arm position of the user using the sensor data, wherein rendering of the avatar includes rendering a corresponding arm of the avatar based on the arm movement vector.

Aspect 22. The system of any of Aspects 13 to 21, wherein the processor is configured to execute the instructions and cause the processor to: receive second sensor data from a second sensor associated with the arm position of the user; determine a forearm movement vector associated with the second sensor and an elbow position, wherein the elbow position is at least partially determined based on the arm motion sensor, and wherein rendering of the avatar includes rendering a corresponding forearm of the avatar based on the forearm movement vector.

Aspect 23. The system of any of Aspects 13 to 22, wherein the second sensor is integral to a controller that is held by the user.

Aspect 24. The system of any of Aspects 13 to 23, wherein the second sensor is integral to a device that is attached to a wrist of the user.

Aspect 25: A non-transitory computer-readable medium comprising instructions which, when executed by one or more processors, cause the one or more processors to perform operations according to any of Aspects 1 to 12.

Aspect 26: An apparatus comprising means for performing operations according to any of Aspects 1 to 12.

What is claimed is:

1. A method, comprising:
    determining a shoulder position based on a height of a user, wherein the shoulder position is mapped to an avatar in a virtual world;
    receiving sensor data from an arm motion sensor attached to the user, wherein the sensor data identifies motion of an arm of the user;
    determining a movement vector of the shoulder position of the user using the sensor data, the movement vector identifying movement of the shoulder position of the user from a first position to a second position;
    determining a shoulder avatar movement vector for a shoulder of the avatar from the movement vector, the shoulder avatar movement vector identifying movement of the shoulder position of the shoulder of the avatar from a first position within the virtual world to a second position within the virtual world; and
    rendering a movement of the shoulder of the avatar from the first position to the second position based on the shoulder avatar movement vector.

2. The method of claim 1, wherein determining the shoulder position comprises:
    determining a shoulder vector from a point on a spine to an estimated neutral shoulder position that corresponds to the height of the user;
    determining the movement vector from the point on the spine to an estimated shoulder position associated with the sensor data; and determining the shoulder avatar movement vector based on the movement vector for an object, wherein the shoulder avatar movement vector is applied to an object of the avatar corresponding to a clavicle.

3. The method of claim 2, wherein determining the shoulder avatar movement vector comprises:
determining a ratio of the shoulder vector to the object of the avatar corresponding to the clavicle, wherein the shoulder avatar movement vector is determined based on scaling the shoulder vector based on the ratio.

4. The method of claim 2, wherein the shoulder avatar movement vector is determined based on a maximum rotation of the object of the avatar corresponding to the clavicle.

5. The method of claim 2, further comprising: receiving the height of the user from an input.

6. The method of claim 2, further comprising determining the height of the user during calibration of the arm motion sensor.

7. The method of claim 2, wherein the estimated neutral shoulder position is substantially equal to a median shoulder position of a person having the same height.

8. The method of claim 1, wherein further comprising:
determining an inversion factor associated with the shoulder position;
when the inversion factor is greater than a minimum threshold, determining a first shoulder position based on inverse kinematics; and
blending the first shoulder position, the shoulder avatar movement vector, and the inversion factor to yield a blended shoulder position, wherein the shoulder of the avatar is to be rendered at the blended shoulder position.

9. The method of claim 1, further comprising:
determining an arm movement vector of an arm position of the user using the sensor data, wherein rendering of the avatar includes rendering a corresponding arm of the avatar based on the arm movement vector.

10. The method of claim 9, further comprising:
receiving second sensor data from a second sensor associated with the arm position of the user;
determining a forearm movement vector associated with the second sensor and an elbow position, wherein the elbow position is at least partially determined based on the arm motion sensor, and wherein rendering of the avatar includes rendering a corresponding forearm of the avatar based on the forearm movement vector.

11. The method of claim 10, wherein the second sensor is integral to a controller that is held by the user.

12. The method of claim 10, wherein the second sensor is integral to a device that is attached to a wrist of the user.

13. A computing apparatus comprising:
a processor; and
a memory storing instructions that, when executed by the processor, configure the apparatus to:
determine a shoulder position based on a height of a user, wherein the shoulder position is mapped to an avatar in a virtual world;
receive sensor data from an arm motion sensor attached to the user, wherein the sensor data identifies motion of an arm of the user;
determine a movement vector of the shoulder position of the user using the sensor data the movement vector identifying movement of the shoulder position of the user from a first position to a second position;
determine a shoulder avatar movement vector for a shoulder of the avatar from the movement vector, the shoulder avatar movement vector identifying movement of the shoulder position of the shoulder of the avatar from a first position in the virtual world to a second position in the virtual world; and
render a movement of the shoulder of the avatar from the first position to the second position based on the shoulder avatar movement vector.

14. The computing apparatus of claim 13, wherein the processor is configured to execute the instructions and cause the processor to:
determine a shoulder vector from a point on a spine to an estimated neutral shoulder position that corresponds to the height of the user;
determine the movement vector from the point on the spine to an estimated shoulder position associated with the sensor data; and
determine the shoulder avatar movement vector based on the movement vector for an object, wherein the shoulder avatar movement vector is applied to an object of the avatar corresponding to a clavicle.

15. The computing apparatus of claim 14, wherein the processor is configured to execute the instructions and cause the processor to:
determine a ratio of the shoulder vector to the object of the avatar corresponding to the clavicle, wherein the shoulder avatar movement vector is determined based on scaling the shoulder vector based on the ratio.

16. The computing apparatus of claim 14, wherein the shoulder avatar movement vector is determined based on a maximum rotation of the object of the avatar corresponding to the clavicle.

17. The computing apparatus of claim 14, wherein the processor is configured to execute the instructions and cause the processor to: receive the height of the user from an input.

18. The computing apparatus of claim 14, wherein the processor is configured to execute the instructions and cause the processor to: determine the height of the user during calibration of the arm motion sensor.

19. The computing apparatus of claim 14, wherein the estimated neutral shoulder position is substantially equal to a median shoulder position of a person having the same height.

20. The computing apparatus of claim 13, wherein the processor is configured to execute the instructions and cause the processor to:
determine an inversion factor associated with the shoulder position;
when the inversion factor is greater than a minimum threshold, determine a first shoulder position based on inverse kinematics; and
blend the first shoulder position, the shoulder avatar movement vector, and the inversion factor to yield a blended shoulder position, wherein the shoulder of the avatar is to be rendered at the blended shoulder position.

* * * * *